428-408 SR
RM041 XR T 964,011

United States Defensive Publication [19] (H) [11] T964,011
Blanken [43] Nov. 1, 1976

[54] ADHESIVE COMPOSITIONS HAVING A CARBON BLACK COMPONENT

[76] Inventor: Thomas C. Blanken, 3 Badhuisweg, Amsterdam, Netherlands

[21] Appl. No.: 772,810

[22] Filed: Feb. 28, 1977

[30] Foreign Application Priority Data

Mar. 30, 1976 United Kingdom ..... 12744/76

[51] Int. Cl.[2] ..... C08L 95/00; C08L 53/02; B32B 11/04; B32B 27/00

[52] U.S. Cl. ..... 428/489; 260/28.5 AS; 260/28.5 AV; 260/28.5 B; 428/408; 428/521; 428/522; 428/523

[57] ABSTRACT

Article provided with a pressure-sensitive adhesive layer composition, which composition is characterized by improved flow resistance at high temperatures (e.g. at 90° C), and which comprises 50–97 parts by weight of a bituminous component dispersed in an extender oil, 3 to 50 parts by weight of at least one thermoplastic polymer, which is preferably a block polymer having the general structure:

A—B—(B-A)n where A is a monoalkenyl arene block, B is a conjugated diene block, and n is an integer from 1–15, and 5 to 50% by weight (based on the combined weight of the bituminous component and the thermoplastic polymer) of a carbon black having an oil absorptivity of above 80 milliliters per 100 grams. Such articles usually possesses good low temperature flexibility, tack and adhesive strength.

9 Claims, No Sheets Drawing,
10 Pages Specification

The file of this unexamined application may be inspected and copies thereof may be purchased (849 O.G. 1221, Apr. 9, 1968).